United States Patent Office 2,870,115
Patented Jan. 20, 1959

2,870,115

COMPOSITION OF VINYL CHLORIDE HOMOPOLYMER AND CHLOROPRENE HOMOPOLYMER AND METHOD OF MAKING SAME

Juel P. Schroeder, Springfield, N. J., assignor to Union Carbide Corporation, a corporation of New York No Drawing. Application October 14, 1953
Serial No. 386,123

2 Claims. (Cl. 260—45.5)

This invention relates to the manufacture of homogeneous thermoplastic compositions comprising essentially a mixture of vinyl chloride homopolymer and homopolymer, otherwise known as neoprene.

Unplasticized or rigid polyvinyl chloride is a relatively hard plastic, but of poor shock-resistance having Izod impact values (notched bar ½ x ½ inch cross-section) ordinarily of only about 0.25 ft.-lb. per inch of notch. To obtain flexible polyvinyl chloride compositions resort has been had to the incorporation of plasticizers in amounts from about 25 to 100 percent by weight of the resin. The unplasticized polyvinyl chloride resin is flame-resistant and this desirable property also attends polyvinyl chloride resins plasticized with a flame-resistant plasticizer, as for example tricresyl phosphate. On the other hand, it is well known that the simple ester-type plasticizers including tricresyl phosphate, di-2-ethyl hexyl phthalate, triethyleneglycol di-2-ethylhexoate and the like are not permanently retained in the polyvinyl chloride resin, but significant amounts are gradually lost therefrom as by evaporation or leaching caused by contact of the plastic with other chemicals such as mineral oils. This gradual loss of plasticizer impairs the flexible properties.

Furthermore, whatever plasticity is imparted by an ester-type plasticizer is most always accompanied by a more or less objectionable lowering of the polyvinyl chloride's softening point.

It has also been proposed to incorporate synthetic rubber in vinyl chloride polymers for the purpose of imparting flexible or shock-resistant properties. But since polyvinyl chloride is substantially incompatible with many synthetic rubbers, at most only a weak mechanical blend or mixture is obtained. Moreover, although polyvinyl chloride is characterized as a thermoplastic material, it decomposes before melting. Hence, a satisfactory dispersion of polyvinyl chloride in a synthetic rubber without some decomposition of the resin is ordinarily not feasible by such conventional procedures as hot milling or mixing in a Banbury.

An earlier proposal for incorporating in a vinyl chloride polymer a synthetic rubber, specifically neoprene which is a homopolymer of 2-chloro-1:3-butadiene was to first plasticize the vinyl chloride polymer with a conventional plasticizer such as dibutyl phthalate and then disperse the neoprene rubber in the plasticized polyvinyl chloride resin together with suitable vulcanizing agents.

While both the neoprene and polyvinyl chloride resin in such compositions are flame-resistant, this desirable property is impaired by the presence of plasticizers such as dibutyl phthalate. Moreover, these plasticized neoprene-vinyl chloride resin mixtures suffer to some extent the usual deficiencies of plasticized vinyl compositions in that the plasticizer is subject to evaporation or leaching by solvents such as mineral oils or kerosene.

Accordingly, one object of the present invention is to form homogeneous compositions of vinyl chloride homopolymer and chloroprene homopolymer containing no volatile plasticizer.

Another object is to obtain homogeneous vinyl chloride homopolymer compositions containing a sufficient amount of chloroprene homopolymer rubber to render the composition more resistant to shock than unmodified vinyl chloride homopolymer resin.

Another object is to homogeneously incorporate chloroprene homopolymer rubber in a vinyl chloride homopolymer resin in a manner avoiding heat-decomposition of the vinyl chloride homopolymer resin.

A further object of the present invention is the production of homogeneous chloroprene homopolymer vinyl chloride homopolymer mixtures which are substantially non-combustible.

The accomplishment of these objects and others will become apparent as the description of the invention proceeds.

It has now been found that homogeneous vinyl chloride homopolymer-chloroprene homopolymer mixtures can be prepared by mixing together an aqueous emulsion of a vinyl chloride homopolymer or copolymer of vinyl chloride and vinyl acetate with an aqueous chloroprene homopolymer emulsion or latex, coagulating the mixed emulsions and removing most of the water from the coagulate as by filtration or centrifuging and then moderately heating to complete the drying of the coagulate. The coagulated mixture when dried ordinarily forms a caked mass which can be readily comminuted to a fine powder. However, for convenience in molding operations where molding materials in granular form are ordinarily preferred, either the mixed emulsion of chloroprene homopolymer and vinyl chloride homopolymer resin or the dried cake can be processed on heated milling rolls for example at temperatures of about 150° C. to completely remove the water and then to fuse the mixture into a consolidated mass which when removed from the rolls and cooled can be ground to a satisfactory particle size for molding purposes, e. g. from about 10 to 100 mesh.

The emulsion polymerization of vinyl chloride or of mixtures thereof with up to about 15% by weight of vinyl acetate to form vinyl chloride-vinyl acetate copolymers are well known. Usually the monomer is dispersed in water with the aid of an emulsifying agent such as sodium lauryl sulfate or sodium stearate and polymerization of the monomer is catalytically promoted by the addition of a water-soluble peroxide catalyst such as sodium perborate, ammonium persulfate, potassium persulfate. The addition of reducing agents as for example sulfur dioxide, alkali sulfites and bisulfites with the alkaline persulfate catalysts promotes very rapid emulsion polymerization. The presence of a buffer salt such as sodium hydrogen phosphate in amounts to impart an acid pH value results in more stable polymer latices.

Surprisingly it has been found that vinyl chloride homopolymer latices having a pH value below 7, and preferably between 2 and 5 can be mixed with the usual alkaline chloroprene homopolymer latex of commerce to form a stable mixed emulsion. Such mixed emulsions however, can be rapidly coagulated by the addition of an electrolyte such as an aqueous salt solution particularly of sodium chloride, magnesium chloride, magnesium sulfate, lead acetate, alum or aluminum sulfate or a water-soluble alcohol as for example ethyl alcohol or methyl alcohol.

The chloroprene homopolymer latices useful for admixture with aqueous vinyl chloride homopolymer emulsions are obtained by alkaline emulsion polymerization of 2-chloro-1,3-butadiene. Preparation of suitable alkaline chloroprene homopolymer latices is described in U. S. Patent No. 2,567,117; the latices therein described having a pH range of from 9 to 12. Also satisfactory for the purposes of the present invention are the alkaline polychloroprene latices described in U. S. Patent No. 2,264,173 and U. S. Patent No. 1,967,861.

Since polyvinyl chloride resins tend to decompose on long time exposure to light and/or heat, it is desirable to incorporate in the composition of chloroprene homopolymer and vinyl chloride homopolymer resin suitable known stabilizers for the resin such as organo metallic compounds containing tin or lead as for example dibutyl tin maleate, dibutyl tin laurate and soaps of calcium, cadmium and lead. Likewise the chloroprene homopolymer component of the composition benefits by the incorporation of conventional anti-oxidants as for example, "Agerite Stalite" which is reported to be a mixture of mono and diheptyl diphenylamines; other satisfactory anti-oxidants are hydroquinone monobenzyl ether, phenyl-beta-naphthylamine and symmetrical di-beta-naphthyl-para-phenylenediamine.

Conventional fillers for vinyl resins such as clays, carbon black, diatomaceous earth, barytes and whiting may be incorporated in the composition although their use ordinarily does not improve the impact or shock-resistance of the composition. Preferably such fillers are incorporated in the compositions after they have been dried to remove substantially all the water present in the original emulsions.

The proportion of vinyl chloride homopolymer to chloroprene homopolymer in the final dried composition can be varied but is determined to a considerable extent by the physical properties desired in the final product. In general, impact strength of the final product increases the higher the proportion of chloroprene homopolymer in the product. On the other hand, the heat-distortion temperature and flexural modulus values are lowered as the amount of the chloroprene homopolymer rubber component is increased, but such compositions exhibit desirable low-temperature properties that is they have brittle temperatures as low as $-36°$ C.

In general, the final products can contain from about 5 to 95 parts by weight of chloroprene homopolymer to about 95 to 5 parts respectively of vinyl chloride homopolymer, the more rigid products being had with major amounts of vinyl chloride resin and the flexible products being obtained with major amounts of chloroprene homopolymer. For example, a composition prepared by coprecipitating a chloroprene homopolymer emulsion and a vinyl chloride homopolymer emulsion such that the coagulated and dried product contained as dry solids equal amounts of neoprene and vinyl chloride homopolymer was considered too stiff as a flexible type material. But a dried coprecipitate containing 70% commercial chloroprene homopolymer ("Neoprene latex 842" which is sold by E. I. du Pont de Nemours) and 30% vinyl chloride homopolymer had in molded form a good combination of stiffness, tensile strength and low temperature properties as shown by the following data:

| | |
|---|---|
| Tensile p. s. i. | 1225 |
| Elongation, percent | 165 |
| Room temperature, stiffness, Modulus, p. s. i. | 2285 |
| $T_F$, ° C | $-41.5$ |
| $T_4$, ° C | $-34.5$ |
| Brittle temperature, ° C | $-36$ |
| Shore hardness | 63 |

Of considerable technical importance, is the fact that with minor amounts 5 to 15 parts of chloroprene homopolymer component to 95 to 85 parts respectively of vinyl chloride homopolymer, there is imparted to the final composition a several-fold increase in shock-resistance as compared to that of unmodified vinyl chloride homopolymer resin, and without undesirable loss of heat-distortion values. This is illustrated in the following tabulation with respect to two different commercial chloroprene homopolymers:

| Ratio by Weight of— | | Izod Impact, ft. lbs. | ASTM Heat Distortion, ° C. |
|---|---|---|---|
| Vinyl Chloride homopolymer | Neoprene "duPont #842" | | |
| 85 | 15 | 1.28 | 71.5 |
| 90 | 10 | 0.58 | 73.5 |
| 95 | 5 | 0.53 | 74.5 |
| Vinyl Chloride homopolymer | Neoprene "duPont" #735 | | |
| 85 | 15 | 0.66 | 70 |
| 95 | 5 | 0.39 | 72.5 |
| Unmodified vinyl chloride homopolymer | | 0.26 | 79 |

The preparation of typical shock-resistant compositions is more specifically described in the following examples, although it should not be construed that the invention is limited thereto.

*Example 1*

740 g. of vinyl chloride homopolymer hydrosol (38.0% solids and a pH of 3.5) and 298 g. of chloroprene homopolymer latex (du Pont type 571; characterized by the manufacturer as an all-purpose type neoprene latex and containing 47.0% solids, sodium rosinate as the emulsifier and when fresh a pH value of 12.4) were thoroughly mixed. The resulting emulsion contained 280 g. of vinyl chloride homopolymer and 140 g. of chloroprene homopolymer on a solids basis. "Santowhite" (commercial diphenol sulfide) (2.8 g.), an antioxidant for the chloroprene homopolymer, and dibutyl tin dilaurate (2.8 g.), a stabilizer for the vinyl chloride homopolymer, were added as aqueous emulsions. The mixture was coagulated by pouring with stirring into a 3% aqueous solution of calcium chloride at 80° C. The coarse granular resin-rubber coprecipitate was recovered from the slurry by filtration, dried and milled four minutes at 150° C. on open rolls with an additional 0.5% each of Santowhite and dibutyl tin dilaurate. The fluxed mass was sheeted from the rolls and several sheets laminated between polished metal plates at 150° C. into a panel. After cooling to room temperature, the panel was removed from the press and found to be translucent, tough and semi-rigid. Test pieces were machined from it and the physical properties determined as listed in the attached table.

*Example 2*

A 2:1 blend on a dry solids basis of vinyl chloride homopolymer and chloroprene homopolymer (du Pont latex type 842A containing 50% solids and having a pH value when fresh of 12.4) was prepared by the identical method described in Example 1 above. The product was very similar in appearance to the one obtained in the first example but darker in color and more opaque. The physical properties of this material are presented in the attached table:

| | Example 1 | Example 2 |
|---|---|---|
| Flexural strength (p. s. i.) | 5,800 | 6,200 |
| Flexural Modulus (p. s. i.) | 0.21×10⁶ | 0.22×10⁶ |
| Tensile Strength (p. s. i.) | 2,900 | 2,800 |
| Tensile Modulus (p. s. i.) | 0.18×10⁶ | 0.17×10⁶ |
| Percent Elongation at Break | 69.5 | 79 |
| Rockwell Hardness | R50 | R56 |
| Heat Distortion Point (° C.) | 65 | 64 |
| Izod Impact Strength (ft.-lbs./inch of milled notch) | 9.2 | 12.3 |

The compositions of vinyl chloride homopolymer and neoprene prepared as herein described which contain neoprene in amount not exceeding about 55% of the composition come within the category of semi-rigid, shock-resistant thermoplastics as heretofore principally exemplified by high styrene-butadiene copolymers and synthetic rubber-modified polystyrene compositions. Shock-resistant thermoplastics fill an obvious void between rigid thermoplastics such as polystyrene which is well known for its brittleness and poor impact strength and the flexible thermoplastics such as highly plasticized or elastomeric polyvinyl chloride compositions which are unsuitable for structural applications.

The shock-resistant thermoplastics based on rubber-modified polystyrene are essentially of a hydrocarbon nature and this accounts for their lack of flame-resistance. On the other hand, the shock-resistant compositions of vinyl chloride homopolymer and chloroprene homopolymer herein described do not support combustion due to the high chlorine content of both components. Furthermore, while some measure of flame-resistance can be imparted to thermoplastic materials by the incorporation of non-combustible plasticizers such as tricresyl phosphate, the amount of plasticer normally required to obtain an effective degree of flame-resistance is such that the thermoplastic material is rendered too flexible for uses requiring structural rigidity. Moreover, such plasticizers are migratory, tending to diffuse or bleed to the surface.

The chloroprene homopolymer component in the present composition is believed to function as a permanent, non-migratory, flame-resistant plasticizer and surprisingly can be present in amounts equal to or slightly more than the vinyl chloride homopolymer and still yield a composition possessing structural rigidity. A further advantage possessed by these chloroprene homopolymer vinyl chloride homopolymer compositions is their resistance to gasoline, oil, water and detergents. While these properties are inherent individually to both the neoprene and vinyl chloride homopolymer compositions heretofore prepared from these components but which were dependent upon the use of a plasticizer for the polyvinyl chloride to obtain a compatible composition, could not be used satisfactorily in applications requiring resistance to such reagents or solvents.

The mixed and dried vinyl chloride homopolymer neoprene compositions are herein described can be hot shaped as by conventional compression, or injection molding procedures, molding temperatures between 150° C. and 250° C. being normally adequate to impart satisfactory molding plasticity. The compositions can also be extruded into various shapes or fomed into sheets by calender rolls. The sheets can, if desired, be further reinforced with textile elements, that is fibers, cloth, or fabric of either natural or synthetic origin which is not affected by temperatures required to heat-shape the composition, for example, cotton, jute, asbestos, glass, polyamides, and polyesters such as "Dacron."

What is claimed is:

1. Process consisting of admixing an aqueous emulsion of a vinyl chloride homopolymer with an aqueous chloroprene homopolymer latex thereby obtaining an emulsion containing two parts by weight vinyl chloride homopolymer per one part by weight chloroprene homopolymer on a solids basis, adding thereto as aqueous emulsions a stabilizer for the vinyl chloride homopolymer and an antioxidant for the chloroprene homopolymer, coagulating the resultant emulsion and recovering the coagulant.

2. A composition obtained by the process defined in claim 1.

References Cited in the file of this patent

UNITED STATES PATENTS

| | | |
|---|---|---|
| 2,278,833 | Crawford | Apr. 7, 1942 |
| 2,614,094 | Wheelock | Oct. 14, 1952 |
| 2,658,050 | Signer et al. | Nov. 3, 1953 |
| 2,755,271 | Tawney et al. | July 17, 1956 |

FOREIGN PATENTS

| | | |
|---|---|---|
| 599,937 | Great Britain | Nov. 24, 1948 |

OTHER REFERENCES

Schildknecht: "Vinyl and Related Polymers," page 395, Wiley and Sons, N. Y. (1952).

Official Gazette of the U. S. Patent Office, June 20, 1950, volume 635, pages 694–97.

India Rubber World, March 1946, 113, No. 6, page 799.

UNITED STATES PATENT OFFICE
CERTIFICATE OF CORRECTION

Patent No. 2,870,115                                                    January 20, 1959

Juel P. Schroeder

It is hereby certified that error appears in the printed specification of the above numbered patent requiring correction and that the said Letters Patent should read as corrected below.

Column 1, line 17, after "homopolymer and" insert -- chloroprene --.

Signed and sealed this 26th day of May 1959.

(SEAL)

Attest:

KARL H. AXLINE                                                        ROBERT C. WATSON

Attesting Officer                                                     Commissioner of Patents